US012627996B2

(12) United States Patent
Bourgeois et al.

(10) Patent No.: US 12,627,996 B2
(45) Date of Patent: May 12, 2026

(54) METHOD AND APPARATUS FOR DESIGNING A RADIO ACCESS NETWORK

(71) Applicant: Telefonaktiebolaget LM Ericsson (publ), Stockholm (SE)

(72) Inventors: Thomas Bourgeois, Kanagawa-ken (JP); Takayuki Takatori, Kanagawu-ken (JP); Yak Ng Molina, Málaga (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 396 days.

(21) Appl. No.: 18/027,548

(22) PCT Filed: Oct. 30, 2020

(86) PCT No.: PCT/EP2020/080581
§ 371 (c)(1),
(2) Date: Mar. 21, 2023

(87) PCT Pub. No.: WO2022/089761
PCT Pub. Date: May 5, 2022

(65) Prior Publication Data
US 2023/0345257 A1 Oct. 26, 2023

(51) Int. Cl.
*H04W 16/18* (2009.01)
*H04W 24/02* (2009.01)
*H04W 24/08* (2009.01)

(52) U.S. Cl.
CPC ........... *H04W 16/18* (2013.01); *H04W 24/02* (2013.01); *H04W 24/08* (2013.01)

(58) Field of Classification Search
CPC ...... H04W 16/18; H04W 24/02; H04W 24/08
(Continued)

(56) References Cited

U.S. PATENT DOCUMENTS 11,722,921 B2 * 8/2023 Pezeshki ............. H04W 52/028
370/329
2007/0097914 A1 5/2007 Grilli et al.
(Continued)

FOREIGN PATENT DOCUMENTS

EP 2742719 A1 6/2014
EP 2884790 A1 6/2015
(Continued)

OTHER PUBLICATIONS

Zhang, C. et al., "Wideband 39 GHz Millimeter-Wave Channel Measurements under Diversified Vegetation", 2018 IEEE 29th Annual International Symposium on Personal, Indoor, and Mobile Radio Communications (PIMRC), Sep. 9-12, 2018, pp. 1-6, IEEE.
(Continued)

*Primary Examiner* — Faisal Choudhury
(74) *Attorney, Agent, or Firm* — COATS & BENNETT, PLLC

(57) ABSTRACT

According to an aspect, there is provided a computer-implemented method for designing a first radio access network, RAN, that is to operate according to a first radio access technology, RAT, in a first frequency range. The method comprises (i) obtaining (901) second RAN radio signal measurements of a second RAN. The second RAN operates according to a second RAT that is different to the first RAT, and/or with a second frequency range that is different to the first frequency range. The second RAN comprises a plurality of second RAN base stations that operate a plurality of second RAN cells, and the second RAN radio signal measurements comprise measurements by a plurality of wireless devices of radio signals on one or more frequencies from one or more of the plurality of second RAN base stations. The method further comprises (ii) processing (902) the second RAN radio signal measurements to (Continued)

estimate corresponding first RAN radio signal measurements that could be measured by said wireless devices if each of said second RAN cells were respective first RAN cells operating according to the first RAT and in the first frequency range; (iii) forming (903) an initial cell deployment for the first RAN based on an estimate of which wireless devices each first RAN cell provides coverage for according to said first RAN radio signal measurements, wherein the initial cell deployment comprises a subset of the first RAN cells; (iv) determining (904) a best serving first RAN cell in the initial cell deployment for each of the wireless devices based on the first RAN radio signal measurements; (v) for each first RAN cell in the initial cell deployment, estimating (905) the first RAN cell resource utilisation based on the wireless devices for which said first RAN cell is determined to be the best serving first RAN cell; and (vi) determining (906) an updated cell deployment based on the initial cell deployment and the estimated first RAN cell resource utilisation for each first RAN cell in the initial cell deployment.

23 Claims, 10 Drawing Sheets

(58) Field of Classification Search
USPC .......................................................... 370/328
See application file for complete search history.

(56) References Cited

U.S. PATENT DOCUMENTS

2010/0311435 A1    12/2010  Mueck et al.
2018/0152268 A1     5/2018  Gauvreau et al.

2019/0059051 A1*    2/2019  Åström ............... H04W 52/028
2020/0137819 A1*    4/2020  Shi ...................... H04W 52/367
2021/0345203 A1*   11/2021  Balasubramanian .........................
                                                        H04W 36/36

FOREIGN PATENT DOCUMENTS

EP            3272149 B1 *   7/2020    ............ H04W 36/24
WO        2013024408 A1      2/2013

OTHER PUBLICATIONS

Kàntor, P. et al., "Influence of Climate Variability on Performance of Wireless Microwave Links", 2013 IEEE 24th Annual International Symposium on Personal, Indoor, and Mobile Radio Communications (PIMRC): Fundamentals and PHY Track, Sep. 8-11, 2013, pp. 891-895, IEEE.

Jarvis, L. et al., "Geolocation of LTE Subscriber Stations Based on the Timing Advance Ranging Parameter", 2011—MILCOM 2011 Military Communications Conference—Track 1—Waveforms and Signal Processing, Nov. 7-10, 2011, pp. 180-187, IEEE.

Yun, Z. et al., "Ray Tracing for Radio Propagation Modeling: Principles and Applications", IEEE Access, vol. 3, Jul. 8, 2015, pp. 1089-1100, IEEE Access.

Penttinen, J. et al., "The LTE-Advanced Deployment Handbook: The Planning Guidelines for the Fourth Generation Networks", Jan. 2016, pp. 1-498, WIley.

Korowajczuk, K., "LTE, WiMAX, and WLAN Network Design, Optimization and Performance Analysis", Nov. 2011, pp. 1-784, Wiley.

* cited by examiner

| Time | UE_ID | ... | Target band 2 | Band 2 top 1 eCGI | Band 2 top 1 RSRP | Band 2 top 1 RSRQ | Band 2 top 2 eCGI | Band 2 top 2 RSRP | Band 2 top 2 RSRQ | Band 2 top 3 eCGI | Band 2 top 3 RSRP | Band 2 top 3 RSRQ |
|---|---|---|---|---|---|---|---|---|---|---|---|---|
| 08:01:3 2:254 | 12345_ 1 | ... | B3 | Cell C | -118 | -10 | Cell D | -123 | -14 | NA | NA | NA |
| 08:01:3 7:354 | 12345_ 2 | ... | B3 | Cell C | -125 | -16 | Cell E | -128 | -18 | NA | NA | NA |
| ... | ... | ... | ... | ... | ... | ... | ... | ... | ... | ... | ... | ... |

METHOD AND APPARATUS FOR DESIGNING A RADIO ACCESS NETWORK

TECHNICAL FIELD

This disclosure relates to designing a radio access network, RAN, that is to operate according to a radio access technology, RAT, in a first frequency range.

BACKGROUND

Radio frequency (RF) network design and optimisation activities require an accurate characterisation of the propagation environment for each cell in order to account for the coverage and interference levels expected in the network. Complex propagation models can be used to achieve this purpose, which requires extensive propagation model optimisation (PMO) campaigns to adapt them to the particular morphology under study. For example propagation models are described in "LTE, WIMAX and WLAN network design, optimization, and performance analysis" by L. Korowajczuk, John Wiley & Sons, 2011, and "The LTE-advanced deployment handbook: the planning guidelines for the fourth generation networks" by Jyrki T. J. Penttinen, John Wiley & Sons, 2016.

Additionally, if the network performance needs to be addressed, detailed traffic maps, which can show the user density and spread areas, are used to run Monte Carlo simulations that estimate the network resource usage. Knowing the location of subscribers (users) within the network is a key component during the above procedure in order to detect high-traffic areas and to be able to reinforce the signal quality and the overall system capacity for them. Currently, the most accurate data sources to achieve that are Cell Traffic Recordings (CTR) and/or crowdsource information. However, the user location based on CTR is based on triangulation techniques (for example as described in "Geolocation of LTE subscriber stations based on the timing advance ranging parameter" by L. Jarvis, J. McEachen and H. Loomis, 2011—MILCOM 2011 Military Communications Conference, Baltimore, M D, 2011, pp. 180-187) and its accuracy is limited to the technology resolution of the measured time difference of arrival (TDOA) and the inter-site distance, achieving an accuracy error between 30 metres (m) and 400 m. On the other hand, the crowdsource information provides limited network information, dependent on the user terminal configuration and Global Positioning System (GPS) availability, which leads to a partial representation of the network, with a clear bias towards outdoor areas.

Nowadays, network operators can depend on Third Party Publishing (3PP) planning tools to characterise the wireless network propagation environments. To design a good network, a deep technology knowledge and precise environment data are needed, which means that the results from a design procedure are highly dependent on the engineers running the services and the amount and type of input data they have access to.

The availability of higher frequency bands for $5^{th}$ Generation (5G) networks has evidenced the need to revisit the traditional tools and processes to account for the new physical effects that takes place in the higher part of the spectrum, adding an extra layer of complexity to the planning tools, such as introducing ray tracing models (as described in "Ray tracing for radio propagation modeling: Principles and applications" by Yun, Zhengqing, and Magdy F. Iskander, IEEE Access 3 (2015): 1089-1100), 3-dimensional (3D) cartography and other effects, such as rain (as described in "Influence of climate variability on performance of wireless microwave links" by Kantor, P., & Bitó, J., 2013 IEEE $24^{th}$ Annual International Symposium on Personal, Indoor, and Mobile Radio Communications (PIMRC), pp. 891-895) and vegetation (as described in "Wideband 39 GHz Millimeter-Wave Channel Measurements under Diversified Vegetation" by Zhang, Chao, et al., 2018 IEEE $29^{th}$ Annual International Symposium on Personal, Indoor and Mobile Radio Communications (PIMRC), IEEE, 2018) to their modelling techniques.

However, both the propagation model optimisation and the ray tracing techniques mentioned above represent a high investment due to license costs and time consumption required for their well-functioning.

A propagation model optimisation requires significant measurement campaigns. Besides, the obtained results are only valid for the network topology where the measurements were taken, having little room for reusability.

On the other hand, ray tracing models require very expensive inputs (e.g. detailed 3D databases and description of the materials), which usually require large computational times to run.

Monte Carlo simulations for performance estimation are cumbersome to operate, relies on hypothesis about the user profiles and the actual user location, and requires several runs in order to achieve convergence and statistical relevance.

Additionally, a low level of automation has been achieved so far in planning activities requiring a high level of expertise and local knowledge to provide a good network solution.

Therefore there is a need for improved techniques for designing a radio access network that is to operate according to a radio access technology in a frequency range.

SUMMARY

The techniques described herein provide for the design of a RAN that is to operate according to a first RAT in a first frequency range based on measurements of another existing RAN. This other RAN either operates according to a different RAT, or operates according to the first RAT but in a different frequency range/band. Thus, the techniques described herein can be used for designing a new layer that is to be added to the existing RAN.

According to a first aspect, there is provided a computer-implemented method for designing a first RAN that is to operate according to a first RAT in a first frequency range. The method comprises (i) obtaining second RAN radio signal measurements of a second RAN, wherein the second RAN operates according to a second RAT that is different to the first RAT, and/or with a second frequency range that is different to the first frequency range; wherein the second RAN comprises a plurality of second RAN base stations that operate a plurality of second RAN cells, and wherein the second RAN radio signal measurements comprise measurements by a plurality of wireless devices of radio signals on one or more frequencies from one or more of the plurality of second RAN base stations; (ii) processing the second RAN radio signal measurements to estimate corresponding first RAN radio signal measurements that could be measured by said wireless devices if each of said second RAN cells were respective first RAN cells operating according to the first RAT and in the first frequency range; (iii) forming an initial cell deployment for the first RAN based on an estimate of which wireless devices each first RAN cell provides coverage for according to said first RAN radio signal measurements, wherein the initial cell deployment comprises a subset of the first RAN cells; (iv) determining a best serving first RAN cell in the initial cell deployment for each of the wireless devices based on the first RAN radio signal measurements; (v) for each first RAN cell in the initial cell deployment, estimating the first RAN cell resource utilisation based on the wireless devices for which said first RAN cell is determined to be the best serving first RAN cell; and (vi) determining an updated cell deployment based on the initial cell deployment and the estimated first RAN cell resource utilisation for each first RAN cell in the initial cell deployment.

According to a second aspect, there is provided a computer program product comprising a computer readable medium having computer readable code embodied therein, the computer readable code being configured such that, on execution by a suitable computer or processor, the computer or processor is caused to perform the method according to the first aspect or any embodiment thereof.

According to a third aspect, there is provided an apparatus for designing a first RAN that is to operate according to a first RAT in a first frequency range. The apparatus is configured to (i) obtain second RAN radio signal measurements of a second RAN, wherein the second RAN operates according to a second RAT that is different to the first RAT, and/or with a second frequency range that is different to the first frequency range; wherein the second RAN comprises a plurality of second RAN base stations that operate a plurality of second RAN cells, and wherein the second RAN radio signal measurements comprise measurements by a plurality of wireless devices of radio signals on one or more frequencies from one or more of the plurality of second RAN base stations; (ii) process the second RAN radio signal measurements to estimate corresponding first RAN radio signal measurements that could be measured by said wireless devices if each of said second RAN cells were respective first RAN cells operating according to the first RAT and in the first frequency range; (iii) form an initial cell deployment for the first RAN based on an estimate of which wireless devices each first RAN cell provides coverage for according to said first RAN radio signal measurements, wherein the initial cell deployment comprises a subset of the first RAN cells; (iv) determine a best serving first RAN cell in the initial cell deployment for each of the wireless devices based on the first RAN radio signal measurements; (v) for each first RAN cell in the initial cell deployment, estimate the first RAN cell resource utilisation based on the wireless devices for which said first RAN cell is determined to be the best serving first RAN cell; and (vi) determine an updated cell deployment based on the initial cell deployment and the estimated first RAN cell resource utilisation for each first RAN cell in the initial cell deployment.

According to a fourth aspect, there is provided an apparatus for designing a first RAN that is to operate according to a first RAT in a first frequency range. The apparatus comprises a processor and a memory, the memory containing instructions executable by said processor whereby said apparatus is operative to (i) obtain second RAN radio signal measurements of a second RAN, wherein the second RAN operates according to a second RAT that is different to the first RAT, and/or with a second frequency range that is different to the first frequency range; wherein the second RAN comprises a plurality of second RAN base stations that operate a plurality of second RAN cells, and wherein the second RAN radio signal measurements comprise measurements by a plurality of wireless devices of radio signals on one or more frequencies from one or more of the plurality of second RAN base stations; (ii) process the second RAN radio signal measurements to estimate corresponding first RAN radio signal measurements that could be measured by said wireless devices if each of said second RAN cells were respective first RAN cells operating according to the first RAT and in the first frequency range; (iii) form an initial cell deployment for the first RAN based on an estimate of which wireless devices each first RAN cell provides coverage for according to said first RAN radio signal measurements, wherein the initial cell deployment comprises a subset of the first RAN cells; (iv) determine a best serving first RAN cell in the initial cell deployment for each of the wireless devices based on the first RAN radio signal measurements; (v) for each first RAN cell in the initial cell deployment, estimate the first RAN cell resource utilisation based on the wireless devices for which said first RAN cell is determined to be the best serving first RAN cell; and (vi) determine an updated cell deployment based on the initial cell deployment and the estimated first RAN cell resource utilisation for each first RAN cell in the initial cell deployment.

Other aspects and embodiments of the techniques described herein will be understood by those skilled in the art based on the description below and the accompanying drawings.

BRIEF DESCRIPTION OF THE DRAWINGS

Some of the embodiments contemplated herein will now be described more fully with reference to the accompanying drawings, in which:

FIG. 3 is a table illustrating the evaluation of anchor coverage for a UE;

DETAILED DESCRIPTION

Figure 1:
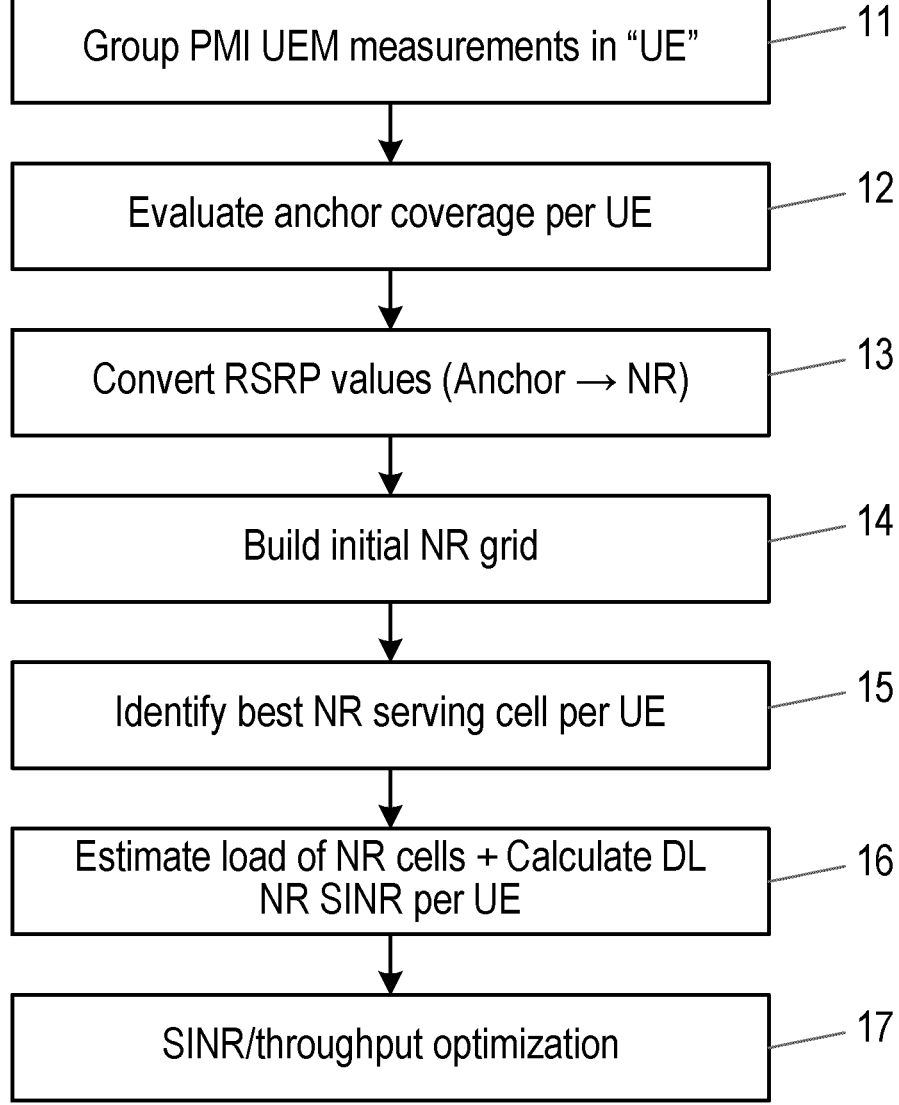
FIG. 1 is a flow chart illustrating an exemplary method of designing a new radio access network according to various embodiments.
Figure 2:
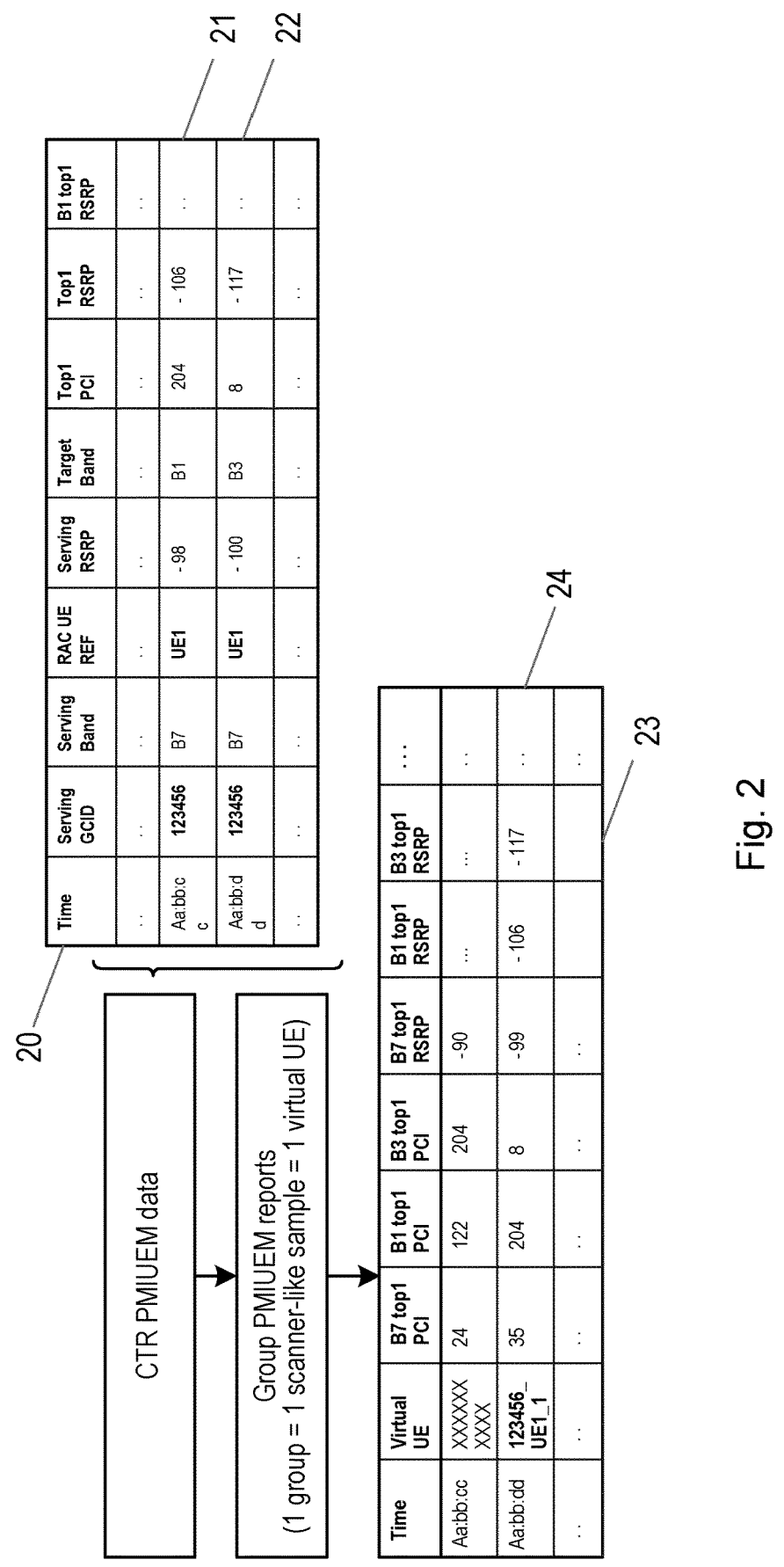
FIG. 2 is an illustration of the optional grouping of separate radio signal measurements to form a set of measurements that could be obtained by a virtual UE.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A specific example of the techniques presented herein is the design of a New Radio (NR)/5G layer that is to be to an existing 4G (Long Term Evolution (LTE)) radio access network (RAN), but it will be appreciated that more generally the techniques can be used for designing a first RAN operating according to a first type of radio access technology (RAT), based on measurements of a second RAN operating according to a second type of RAT or according to the first type of RAT but in a different frequency band or range. Possible RATs include Global System for Mobile Communications (GSM), Universal Mobile Telecommunications System (UMTS), Long Term Evolution (LTE), New Radio (NR) and/or other $2^{nd}$ Generation (2G), $3^{rd}$ Generation (3G), $4^{th}$ Generation (4G), or 5G standards, wireless local area network (WLAN) standards, such as the IEEE 802.11 (WiFi) standards; and/or any other appropriate wireless communication standard, such as the Worldwide Interoperability for Microwave Access (WiMax), Bluetooth, Z-Wave and/or ZigBee standards.

Thus, the techniques described herein propose the use of user equipment (UE) measurements of an existing network to enable the design and planning of a co-located new layer of the same or different radio access technology.

The UE measurements (also referred to herein as 'cell traffic recordings') form a 'traces database' and this information is used as a network simulator where the measured signal strength values (for both serving and neighbour cells) are converted and extrapolated to reflect the expected behaviour of users that could potentially be connected to a co-located network that uses a different RAT or frequency range/band. In some embodiments, estimated signal quality measurements (e.g. estimated Reference Signal Received Power (RSRP) values in LTE or NR) can be used to estimate user (UE) coverage and/or interference values, and these can be used as an input to a cell site selection and optimisation process based on coverage and/or interference metrics.

Signal quality (e.g. RSRP) values can be converted to the new frequency or new RAT by means of a pathloss conversion equation which takes into account the different physical effects experienced by the signals in the different RAT or frequency range that may impact the difference in the received signal quality values. Various characteristics of the new RAT/frequency layer that can be taken into account include any of antenna gain, number of antenna ports, pathloss difference, transmission power, UE antenna gain, in-building penetration losses, available bandwidth, and feeder losses.

In some embodiments, the concept is further extended to simulate the network performance of the new layer. The procedure considers a scaled user demand of each single connection in the network and the expected interference in the new layer. From that information the estimated spectral efficiency of each connection can be computed, and the user's resource consumption can be aggregated to calculate performance metrics at a cell level. As this solution is based on user coverage and performance metrics obtained from an existing network layer, it allows for decisions to be taken based on the needs of end users.

From a coverage perspective, only locations (i.e. base stations that control the cells) that provide coverage in the existing layer to existing users can be proposed for the new layer, which can avoid the need for investment in those cells that provide overlapping coverage or that cover unpopulated or low-population areas.

From a performance perspective, an improved or optimum site density can be proposed to minimise the interference in the cluster and maximise the user throughput performance.

Moreover, the disclosed techniques enable several different existing layers to be considered as potential locations for the new layer deployment, and the disclosed algorithm can enable a layer to be identified that provides a higher gain in terms of coverage and performance among nearby alternatives. This offers a solution in complex heterogenous networks with mixed physical parameters, such as height, azimuth and tilts.

Using a traces database as a network simulator enables a higher level of accuracy to be achieved compared to traditional prediction methods. In particular this is due to (i) there being full network visibility by collecting all user measurements in a given period of time, (ii) the baseline performance of the network being a real network state and not a predicted scenario, (iii) network capacity is accurately computed thanks to the measured user demand at connection level, without the need to perform several Monte Carlo simulations that could model the different traffic profiles in the network, and (iv) user geographical locations do not need to be estimated since all metrics are computed in statistical mode.

Thus, the techniques described herein provide an alternative solution to the use of traditional propagation models, reducing the costs associated with 3PP tools, propagation model optimisation (PMO) campaigns and map databases, leveraging a high level of automation and massive user data collection campaigns.

The method requires collection of cell traffic recordings from the existing (second) RAN. The cell traffic recordings can include measurements of signals received over the air interface (e.g. relating to data connections, voice calls, etc.) and/or measurements/recordings of internal events at the connection level. These are used to estimate the coverage and performance of each connection as if it was served by a different frequency layer or RAT. The calculation can be done based on the measured signal strength levels, both for a serving cell and one or more neighbouring cells, and the user demand. From the signal strength levels of the serving cell the isotropic losses can be calculated and extrapolated to a different frequency layer or RAT, and neighbour signal strength values can be used to create an interference matrix, and from the user demand the cell resource usage and interference can be calculated.

An embodiment of the techniques presented herein will now be described with reference to FIGS. 1-9. FIGS. 1-9 relate to the specific example of designing a NR RAN (referred to as a first RAN) that is to be co-located with an existing 4G LTE RAN (referred to as a second RAN). However, those skilled in the art will appreciate that the described techniques can be readily applied to a new network layer using a different type of RAT, or to a new network layer that uses the same type of RAT as the existing layer but in a different frequency range or frequency band.

FIG. 1 is a flow chart illustrating an exemplary method of designing a new NR RAN according to various embodiments. As noted, the method provides a network planning and design process based on the end user performance of an already existing network layer (the LTE RAN). The method can be performed by any suitable computer or server, and the computer or server does not need to be a part of the communication network associated with the LTE RAN. However, in some embodiments the method can be implemented by a network node in a core network associated with the LTE RAN.

The existing LTE RAN is deployed over a geographical area and is in use by various subscribers to the network. These subscribers have respective UEs (or more generally wireless devices) that can use the LTE RAN. The LTE RAN comprises a number of LTE base stations (i.e. base stations that operate according to LTE standards) at various locations throughout the area. Each LTE base station operates one or more LTE cells (i.e. cells that are operated according to LTE standards).

During their normal operation (i.e. normal operation according to the LTE standards), the UEs using the LTE RAN make measurements of radio signals received from the base stations over the air interface. These measurements can include signal quality measurements, such as measurements of RSRP, Reference Signal Received Quality (RSRQ), and Physical Uplink Control Channel (PUCCH) Signal-to-Inter-ference-plus-Noise Ratio (SINR). The UEs can report these measurements (the cell traffic recordings) to the LTE RAN and the measurements can be sent to a database for storage and subsequent use by the apparatus that implements the network layer design technique. This database (the 'traces database') may be a part of the LTE RAN, part of the core network associated with the LTE RAN, or external to the LTE network. Over a suitable period of time, radio signal measurements will be collected by multiple UEs while at multiple different geographical locations in the LTE RAN and of multiple LTE cells. More generally, the radio signal measurements of the LTE RAN are referred to as second RAN radio signal measurements.

In an LTE RAN, a UE can perform radio signal measurements on the cell that the UE is primarily connected to (referred to as the serving cell), and also perform radio signal measurements on signals in one or more other frequency bands that are in use in the LTE RAN. At different times, the UE can perform radio signal measurements on different ones of the other frequency bands that are in use in the LTE RAN. Some exemplary measurements by a particular UE are shown in table 20 of FIG. 2.

Table 20 shows two separate radio signal measurements by a particular UE. In this example, each UE obtains radio signal measurements of its serving cell and radio signal measurements of one or more neighbour cells (e.g. up to eight) in a different frequency band. Radio signal measurement 21 includes a Serving Global Cell Identity (GCID) identifying the serving cell, a Serving Band identifying the frequency band used by the serving cell (band B7 in radio signal measurement 21), a Radio Admission Control (RAC) UE Reference (RAC UE REF), which is a temporary identification number assigned by the eNodeB to a connection (U E1 in radio signal measurement 21), a RSRP measurement of the serving cell in band B7 (−98 dBm in radio signal measurement 21), a Target Band for the neighbour cell measurement (band B1 in radio signal measurement 21), a Physical Cell Identity (PCI) of the best (Top1) neighbouring cell (204 in radio signal measurement 21) and a RSRP measurement of the Top1 neighbouring cell in band B1 (−106 dBm in radio signal measurement 21). Although not shown in FIG. 2, radio signal measurement 21 includes fields for measurements of further neighbouring cells (e.g. up to eight neighbouring cells in LTE). The measurements in radio signal measurement 21 were obtained at time Aa:bb: cc. Radio signal measurement 22, which was obtained very shortly after radio signal measurements 21 at time Aa:bb:dd, includes another RSRP measurement of the serving cell in band B7 and a RSRP measurement of a target neighbouring cell in band B3. More generally, the radio signal measurements in table are referred to as Cell Traffic Recording (CTR) Performance Management-Initiated UE Measurements (PMIUEM) data.

As various measurements in Table 2 are obtained by particular UEs of different neighbouring cells at generally the same time (and so it can be assumed that the UE was at the same physical location when those different measurements were made), in an optional first step 11 of the method of FIG. 1, the radio signal measurements from different frequency bands can be grouped together to create scanner-like samples, in which one sample can contain interference information for several different frequency bands. That is, a network scanner would be configured to obtain interference information for multiple different (or all available) frequency bands each time that it performs measurements. These scanner measurements can be approximated by combining together closely-related (in time and location) UE measurements of different frequency bands into a single sample, which is referred to as a 'virtual UE'. This is shown in table 23 of FIG. 2 where elements of radio signal measurement 21 and radio signal measurement 22 are grouped to form a single measurement sample 24. In particular, radio signal measurement 21 included a measurement of neighbour band B1 and radio signal measurement 22 included a measurement of neighbour band B3, and these measurements are both included in measurement sample 24 so that measurement sample 24 contains interference information for bands B1 and B3. Combining or grouping these measurements in effect creates measurements that could be obtained by a virtual UE that is able to perform radio signal measurements on multiple frequency bands. This enables the design method to make use of radio signal measurements obtained by a normal UE, and does not require the deployment of specialised network scanners to obtain measurements of the existing LTE RAN.

It should be appreciated that radio signal measurements can be grouped where they are made by the same UE and within a short period of time, e.g. less than 1 second.

The following steps of the method of FIG. 1 apply to the combined radio signal measurements and refer to the virtual UEs formed by the grouping step. As noted, the grouping of radio signal measurements is useful to provide visibility of the interference experienced in multiple frequency bands. However, it will be appreciated that step 11 can be omitted and the rest of the process performed on the basis of the measurements actually obtained by the UEs, e.g. measurements of the serving cell and measurements of one or more neighbouring cells in the serving cell frequency band (and thus references to a virtual UE or virtual UE measurements should be understood as including the actual measurements by an 'actual UE' in the case where measurement grouping is not performed).

All the frequency bands for which radio signal measurements are available in table 20 or table 23 can be used as the baseline LTE RAN for the NR/5G co-location planning process in the following steps of the method of FIG. 1.

For a new NR RAN that is to share the same LTE core network as the existing LTE RAN, with UEs using the NR RAN for user plane data and the LTE RAN for control plane data, it is necessary for each UE to be 'anchored' in the LTE RAN. That is, each UE is required to have coverage from the LTE RAN in order to operate in the NR RAN. Thus, in an embodiment in which this LTE anchor coverage is required, an optional step 12 of FIG. 1 is performed.

In step 12 it is evaluated whether each virtual UE has anchor coverage in the LTE RAN. Where the virtual UE has anchor coverage, the best LTE anchor carrier frequency is identified for each virtual U E. The best LTE anchor carrier frequency can be identified as the LTE cell providing the highest signal strength (e.g. highest RSRP) at the virtual UE.

A virtual UE is considered to lack LTE anchor coverage when no single cell satisfies each of the following conditions:

$$RSRP>threshold \qquad (1)$$

$$RSRQ>threshold \qquad (2)$$

$$PUCCH\ SINR>threshold \qquad (3)$$

Thus, a virtual UE (or actual UE, if step 11 is not performed) has LTE anchor coverage if there is at least one cell measured by the virtual UE for which criteria (1), (2) and (3) are satisfied. For any virtual UE (or actual UE) that does not have LTE anchor coverage, that virtual UE (or actual UE) and the associated measurements are not used in the following steps. However, a record is kept of the number of virtual UEs that will not be able to access the new NR layer.

The RSRP and RSRQ thresholds can be configurable inputs for the RAN design algorithm, and the PUCCH SINR threshold can be in accordance with the Coverage and Capacity Dimensioning guidelines for LTE and be dependent on the diversity configuration in reception.

FIG. 3 is a table illustrating the evaluation of anchor coverage for a UE. Thus, for a virtual UE with UE identity (UE_ID) 12345_1 (line 31 of FIG. 3), Cell C has an RSRP=−118 and a RSRQ=−10. If it is assumed that the RSRP threshold is −119 and the RSRQ threshold is −13, then UE 12345_1 is considered to have anchor coverage in LTE from Cell C. However, using these RSRP and RSRQ thresholds indicates that the virtual UE with UE_ID 12345_2 does not have LTE anchor coverage from Cell C or Cell E, and so UE 12345_2 is not able to use the NR RAN for user plane data. UE 12345_2 is considered to be out-of-NR-coverage.

Next, in step 13 of FIG. 1, the LTE radio signal measurements are converted into corresponding radio signal measurements for the NR RAN. In particular, these corresponding NR RAN radio signal measurements are estimates of the measurements the virtual UEs would measure if an NR cell was deployed at the same location at the LTE cell. For example the LTE RSRP measurements can be converted into NR RSRP (e.g. synchronisation signal (SS)-RSRP) measurements.

LTE and NR differ in a number of ways, and these differences can be factored in to convert the LTE measurements into estimated NR measurements. For example, the calculation in step 13 can take into account any of pathloss conversion values, average indoor penetration losses, LTE and NR transmission power, antenna gain, cable loss and LTE Cell Specific Reference Signal (CRS) power boost configuration.

Pathloss conversion between RATs can be based on the isotropic loss estimation of the existing RAN.

The received power can be calculated as the transmitted power minus the signal attenuation as follows:

$$P_{RX}=P_{TX}-L_{sa} \qquad (4)$$

where $P_{RX}$ is the received power, $P_{TX}$ is the transmitted power, and $L_{sa}$ is the signal attenuation. The signal attenuation can be expressed as shown in Equation (5) below as the isotropic loss minus the antenna gains from the UE and the base station. Referencing to 0 dBi antennas makes comparisons easier when channels have different antenna gains. Thus, signal attenuation $L_{sa}$ can be derived as follows:

$$L_{sa}=L_{isotropic}-(G_{a,BS}+G_{a,UE}) \qquad (5)$$

where $L_{isotropic}$ is the isotropic loss, $G_{a,BS}$ is the antenna gain in the base station and $G_{a,UE}$ is the antenna gain in the UE.

Finally, the isotropic loss can be calculated as the pathloss plus the aggregation of fixed losses.

$$L_{isotropic}=L_{pathloss}+\Sigma(fixed\ losses) \qquad (6)$$

where $L_{pathloss}$ is the pathloss.

To extrapolate the NR SS-RSRP from LTE measurements, five correction factors can be defined:

1. A pathloss correction factor, $CF_{pathloss}=L_{pathloss,NR}-L_{pathloss,LTE}$, where $L_{pathloss,NR}$ is the pathloss in NR and $L_{pathloss,LTE}$ is the pathloss in LTE.

2. A power correction factor, $CF_{PTX}=P_{TX,NR}-P_{TX,LTE}$, where $$P_{TX,NR}=10\ log_{10}(PA_{power,NR})-10\ log_{10}(12*n_{RB})-10\ log_{10}(number_{antenna\ ports}) \qquad a.$$

$$P_{TX,LTE}=10\ log_{10}(PA_{power,LTE})-10\ log_{10}(12*n_{RB})-10\ log_{10}(number_{antenna\ ports})+crsGain \qquad b.$$

and where $PA_{power,NR}$ is the cell transmission power of the NR cell, $n_{RB}$ is the number of Resource Blocks (RB), $PA_{power,LTE}$ is the cell transmission power of the LTE cell, and $number_{antenna\ ports}$ is the number of antenna ports.

3. A base station antenna correction factor, $CF_{a,BS}=G_{a,BS,NR}-G_{a,BS,LTE}$ where $G_{a,BS,NR}$ is the antenna gain in the NR base station, and $G_{a,BS,LTE}$ is the antenna gain in the LTE base station.

4. A UE receiver antenna correction factor, $CF_{a,UE}=G_{a,UE,NR}-G_{a,UE,LTE}$ where $G_{a,UE,NR}$ is the antenna gain in the NR UE, and $G_{a,UE,LTE}$ is the antenna gain in the LTE UE.

5. A fixed losses correction factor, $CF_{fixed\_losses}=\Sigma(fixed\_losses_{NR})-\Sigma(fixed\_losses_{LTE})$, which can account for any of the following effects: radio base station (RBS) feeder loss, antenna jumper loss, UE cable loss, building penetration loss, foliage loss, car penetration loss and body loss.

According to the above definitions, the received NR power can be expressed as a function of the received power in LTE:

$$P_{RX,NR}=P_{RX,LTE}+CF_{PTX}-CF_{pathloss}-CF_{fixed\ losses}+(CF_{a,BS}+CF_{a,UE}) \qquad (7)$$

where $P_{RX,NR}$ is the received NR power, and $P_{RX,LTE}$ is the received LTE power.

Figure 4:
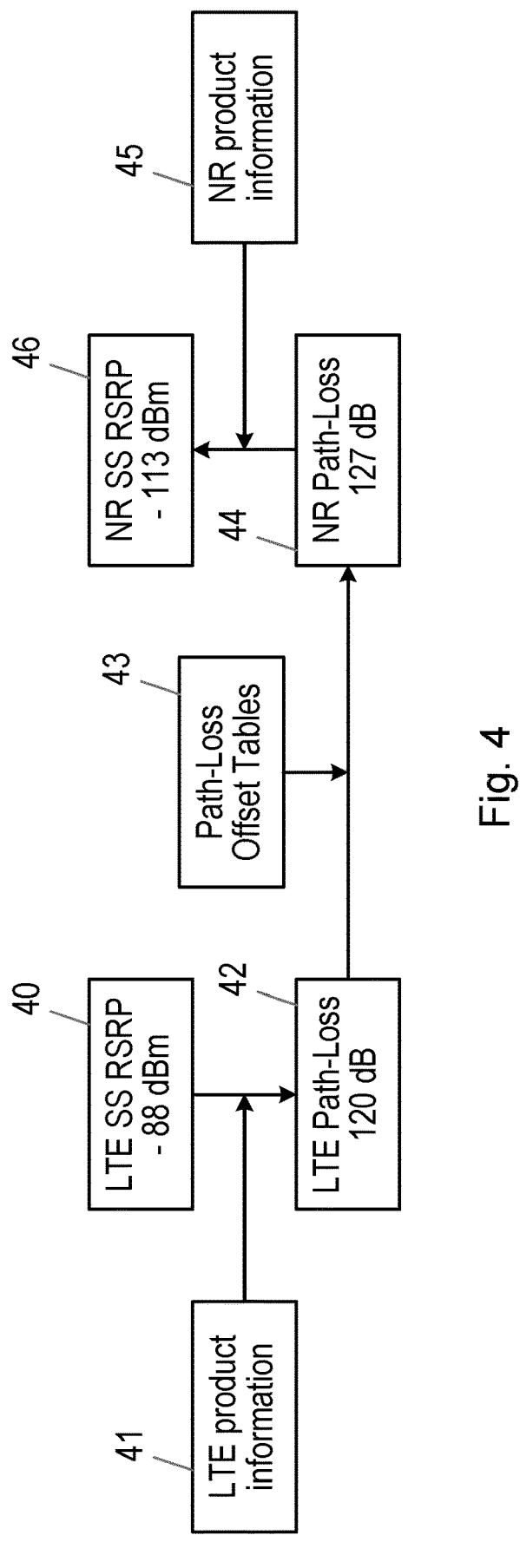
FIG. 4 is an illustration of the estimation of corresponding radio signal measurements for the new RAN.

FIG. 4 illustrates the estimation of corresponding NR radio signal measurements for the NR RAN from the LTE measurements. Thus an LTE SS RSRP measurement 40 of −88 dBm can be processed in view of product information 41 about the LTE RAN and/or LTE UE (e.g. the LTE antenna gain, etc.) to determine the LTE pathloss 42 (120 dB). Based on the LTE pathloss 42 and pathloss offset tables 43, an NR pathloss 44 is estimated (in this case, 127 dB). The NR pathloss 44 is used in conjunction with NR product information 45 (e.g. NR antenna gain, etc.) to estimate the NR SS RSRP 46 (−113 dBm in this example).

In step 14 of FIG. 1, an initial cell deployment for the NR RAN is formed based on the NR radio signal measurements estimated in step 13. The initial cell deployment is also formed based on an estimate of which virtual UEs each potential NR cell provides coverage for.

Coverage for each virtual UE can be evaluated as follows. A particular virtual UE is considered to have NR coverage in a particular cell if the following are satisfied for that cell (noting here that it is proposed to co-locate an NR cell with each LTE cell):

$$LTE\ RSRP>threshold \qquad (8)$$

$$LTE\ RSRQ>threshold \qquad (9)$$

LTE PUCCH SINR>threshold    (10)

NR SS-RSRP>threshold    (11)

NR PUCCH SINR>threshold    (12)

NR PUSCH SINR>threshold    (13)

where PUSCH is the Physical Uplink Shared Channel. As in optional step 12 of FIG. 1, the RSRP, SS-RSRP, RSRQ and SINR thresholds (both LTE and NR) can be configurable inputs for the RAN design algorithm (noting that the thresholds in (8)-(10) should be the same as when checking for LTE anchor coverage in step 12—equations (1)-(3)), and the rest (i.e. the thresholds in (11)-(13)) can be in accordance with the Coverage and Capacity Dimensioning guidelines for LTE and NR and be dependent on the diversity configuration in reception.

Each potential NR cell is evaluated to determine which of the virtual UEs have coverage from that cell. The numbers of virtual UEs that each potential NR cell can provide coverage for is noted.

The potential NR cell that provides the coverage for the highest number of virtual UEs is added to the initial cell deployment as a first NR cell. Leaving aside those virtual UEs that can receive coverage from the first NR cell, the number of virtual UEs that each remaining potential NR cell provide coverage to is recounted. The potential NR cell providing coverage to the highest number of virtual UEs after the recount is added to the initial cell deployment as a second NR cell. This process continues until the number of virtual UEs not yet covered by a NR cell in the initial cell deployment is less than a threshold. This threshold is configurable, and in some embodiments could be 0 (in which case the process continues until every virtual UE is covered by a NR cell in the initial cell deployment. The aim of step 14 in FIG. 1 is to form the initial cell deployment using a subset of the potential NR cells, since only the potential NR cells that are the most useful for providing coverage will be included in the initial cell deployment. Thus, preferably one or more of the available set of potential NR cells are not included in the initial cell deployment.

The identities of the potential NR cells that are not included in the initial cell deployment are stored, along with information indicating the number of virtual UEs that those cells cover, since further potential NR cells can be added to the initial cell deployment in a subsequent step of the method.

Figure 5:
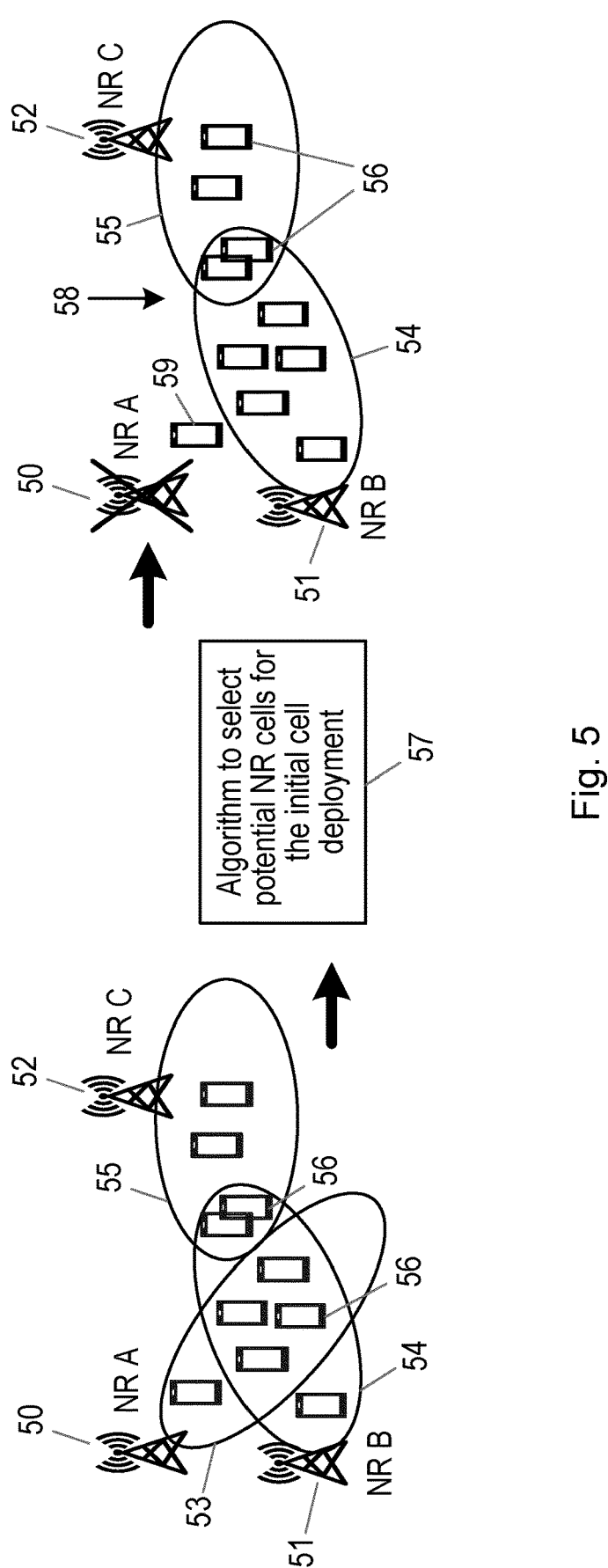
FIG. 5 is an illustration of the building of an initial cell deployment for the new RAN.

FIG. 5 shows an example of building of an initial cell deployment for a NR RAN. The left side of FIG. 5 shows three potential NR base stations 50, 51, 52 (that are co-located with existing LTE base stations), labelled NR A, NR B and NR C respectively. Each potential NR base station has a respective cell 53, 54, 55, labelled cell A, cell B and cell C respectively. It will be appreciated that in practice a single base station may provide and control multiple cells, but only a single cell per base station is shown in FIG. 5. Various virtual UEs 56 are shown throughout the coverage area of the cells 53, 54, 55.

After evaluating the coverage for each virtual UE 56, it is found that potential NR cell A 53 covers 5 virtual UEs 56, potential NR cell B 54 covers 7 virtual UEs 56, and potential NR cell C 53 covers 4 virtual UEs 56. The algorithm 57 described above for selecting potential NR cells for the initial cell deployment proceeds as follows.

Potential NR cell B 54 covers the most virtual UEs 56 so it is placed in the initial cell deployment 58 shown on the right side of FIG. 5. Of the virtual UEs 56 not covered by potential NR cell B 54, two virtual UEs 56 are covered by potential NR cell C 55 and one virtual UE is covered by potential NR cell A 53. Thus, potential NR cell C 55 provides coverage for the highest number of remaining virtual UEs 56 and is added to the initial cell deployment 58. That leaves potential NR cell A 53 that provides coverage for the remaining virtual UE 56. Assuming the threshold applied at the end of the algorithm 57 is 2 virtual UEs, then potential NR cell A will not be added to the initial cell deployment 58 as it only covers one virtual UE not covered by any of the already-placed NR cells (this virtual UE is labelled 59 in the right side of FIG. 5). This means that, according to the initial cell deployment 58, virtual UE 59 will not have coverage from the NR RAN.

Table 1 below summarises the operation of the algorithm 58 for the example in FIG. 5.

TABLE 1

| NR Grid | Covered UEs | Contributed UEs | NR Contribution Ratio |
|---|---|---|---|
| NR Cell B | 7 | 7 | 100% |
| NR Cell C | 4 | 2 | 50% |
| NR Cell A | 5 | 1 | 20% |

Thus, in Table 1, the column 'Covered UEs' indicates the number of virtual UEs 56 that are considered to have coverage from that potential NR cell. The column 'Contributed UEs' indicates the number of virtual UEs 56 that that potential NR cell provides coverage for after the respective round of recounting of virtual UEs. The NR contribution ratio is given by 'Contributed UEs'/'Covered UEs'. Thus NR Cell B 54 has a contribution ratio of 100% and so it is recommended or highly desirable to place that potential NR cell in the initial cell deployment 58. NR Cell C 55 has a contribution ratio of 50%, so placing that cell in the initial cell deployment 58 is a lower priority, but still relatively useful. NR Cell A 53 only provides coverage for one virtual UE not covered by the already-placed NR cells, and so this NR cell can be discarded if the coverage goal for the initial cell deployment 58 is not 100%.

After forming the initial cell deployment, in step 15 of FIG. 1, the best NR serving cell is identified for each virtual UE. As noted above, the initial cell deployment 58 is formed in step 14 based on the numbers of virtual UEs covered by each potential NR cell, and it is possible that a potential NR cell providing the best coverage to a particular virtual UE is not included in the initial cell deployment 58. In that case, the virtual UE would be served by a different NR cell in the initial cell deployment 58, and step 15 aims to identify the best NR serving cell for each virtual UE.

The best NR serving cell for each virtual UE is determined as the NR cell in the initial cell deployment 58 that has the best signal strength for the virtual UE 56, e.g. the best NR RSRP.

In the exemplary initial cell deployment 58 shown in FIG. 5, the best serving NR cell for most virtual UEs 56 is easy to determine, since most virtual UEs 56 are only in the coverage of one of NR Cell B 54 and NR Cell C 55. However, there are two virtual UEs 56 that have coverage from both NR Cell B 54 and NR Cell C 55, and so the best NR serving cell for each of those virtual UEs 56 is determined in step 15 based on which of NR Cell B 54 and NR Cell C 55 provide the highest estimated NR RSRP to each virtual UE.

After identifying the best NR serving cell for each virtual UE 56, the numbers of virtual UEs 56 served by each NR cell is determined. This information is used in subsequent steps to estimate the resource utilisation in each NR cell.

Thus, in step 16 of FIG. 1, the resource utilisation of each of the NR cells in the initial cell deployment 58 is estimated based on the virtual UEs that each NR cell is considered to provide coverage for.

Briefly, for each NR cell in the initial cell deployment 58, step 16 comprises estimating a NR cell load based on the virtual UEs that the NR cell is the best NR serving cell for. A respective NR downlink signal quality is estimated for each virtual UE served by the NR cells based on the estimated NR cell loads, and the NR cell resource utilisation is estimated for each NR cell using the estimated NR downlink signal quality for each virtual UE and the estimated NR cell load.

Figure 6:
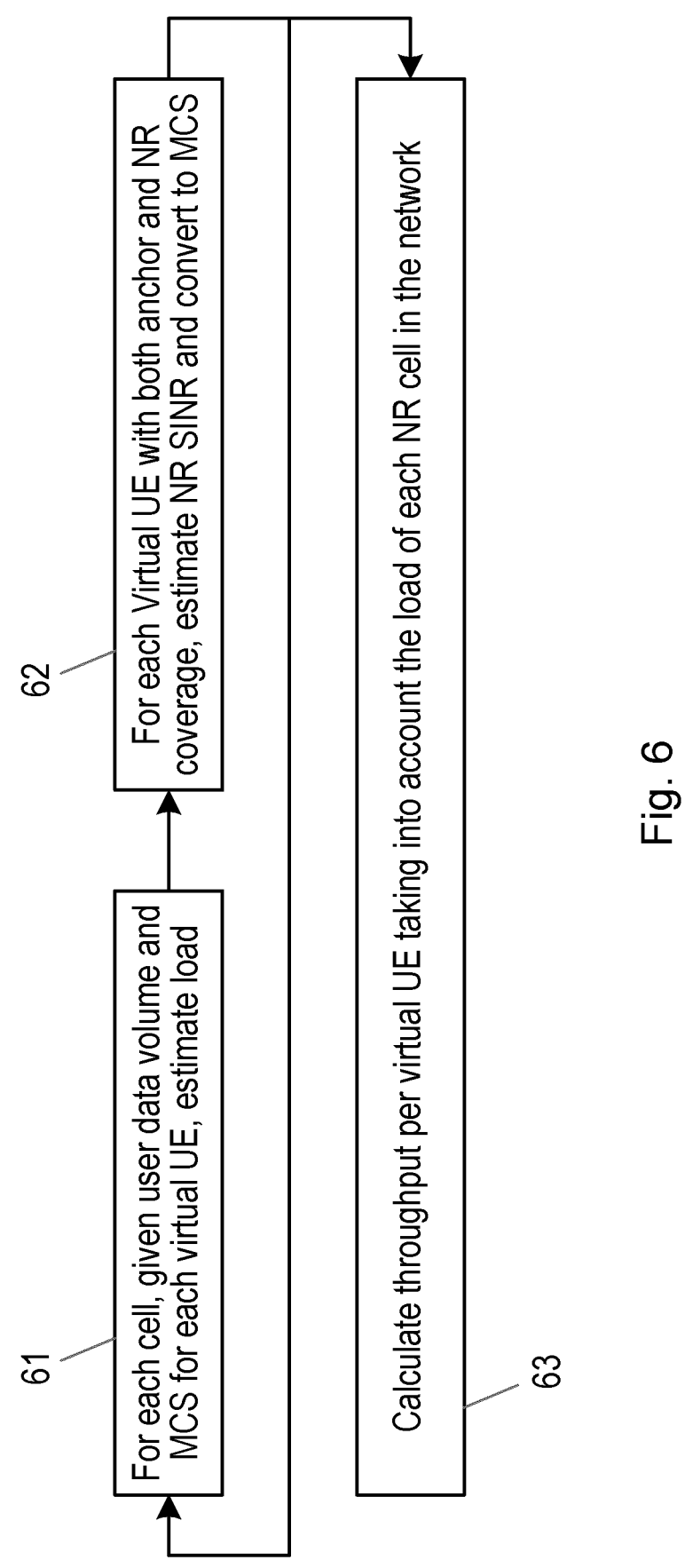
FIG. 6 is a flow chart illustrating a method for estimating cell resource utilisation.
Figure 7:
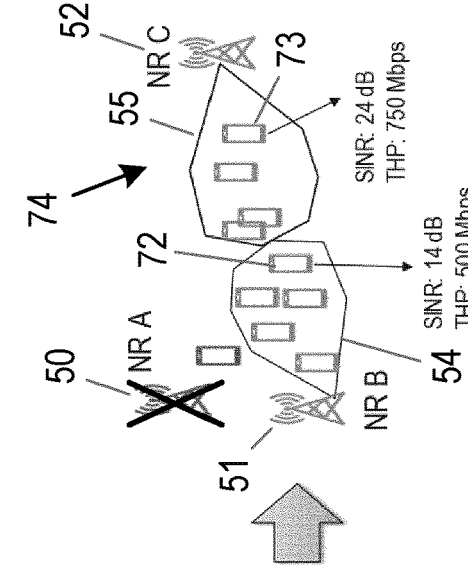
FIG. 7 is an illustration of the method for estimating cell resource utilisation shown in FIG. 6.
Figure 7:
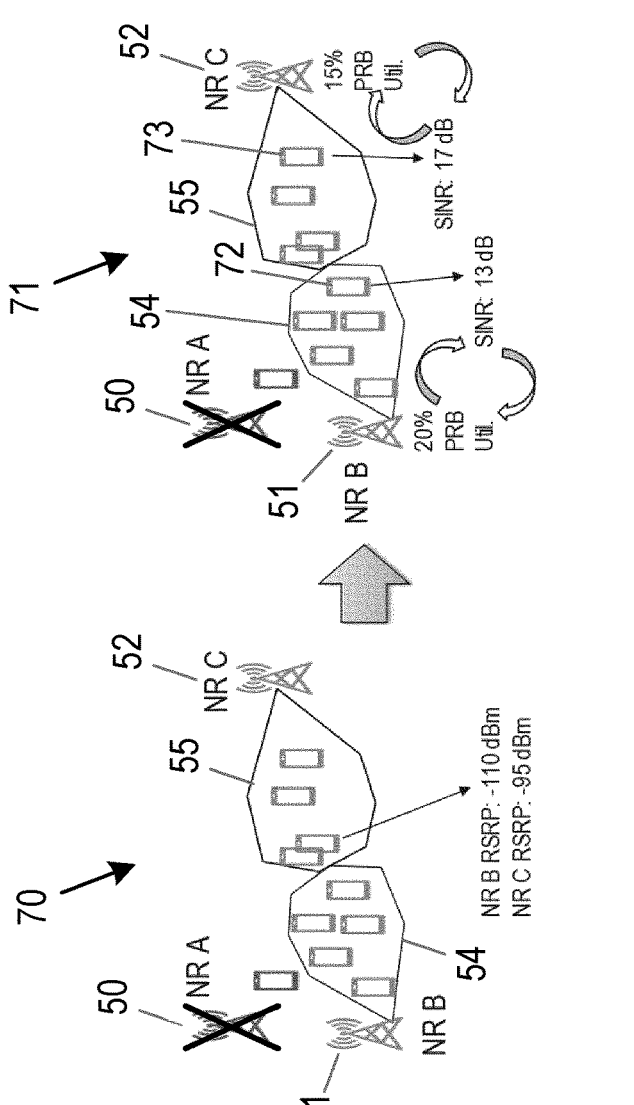

A particular example of step 16 is set out below with reference to FIGS. 6 and 7. FIG. 6 is a flow chart illustrating an exemplary method for estimating cell resource utilisation and FIG. 7 shows the exemplary method applied to the initial cell deployment 58 shown in FIG. 5. The left side of FIG. 7, labelled 70, shows the identification of the best NR serving cell for each virtual UE in the initial cell deployment 58 from step 15 of FIG. 1. For example, one of the two virtual UEs 56 that has coverage from both NR Cell B 54 and NR Cell C 55 has an RSRP of −110 dBm for NR Cell B 54 and an RSRP of −95 dBm for NR Cell C 55. Thus, the best NR serving cell for that virtual UE will be NR Cell C 55.

In step 61 of FIG. 6, for each NR cell, given user data volume (e.g. as indicated by information on the previous behaviour of each UE in the LTE RAN) and a Modulation and Coding Scheme (MCS) for each virtual UE, the cell load is estimated. In particular, a convergence function can be evaluated to estimate the cell load for each NR cell in the initial cell deployment 58 formed in step 14.

Once the cell load is calculated for all NR cells in the initial cell deployment 58, then in step 62 of FIG. 6, the PDSCH SINR for each virtual UE with both anchor LTE coverage and NR coverage can be calculated. The PDSCH SINR values allow the estimation of the user (virtual UE) throughput once a given data volume is assumed per virtual UE.

Thus the process starts with a default physical resource block (PRB) utilisation value assigned to all NR cells in the initial cell deployment 58. For example the default PRB utilisation value can be 15%. With a default PRB utilisation value, the PDSCH SINR value per virtual UE can be calculated according to the following:

$$PDSCH\ SINR = E\left\{\frac{P_{serv}}{P_{noise} + \sum_i A_i P_{i,interf}}\right\} = \tag{14}$$

$$\sum\nolimits_{a_0}^{1} = 0 p_{A_0(a_0)} \cdots \sum\nolimits_{a_N}^{1} = 0 p_{A_N(a_N)} \frac{P_{serv}}{P_{noise} + A_0 P_0 + \ldots + A_N P_N}$$

where $P_{serv}$ is the radiated power of the serving cell in the PDSCH channel, $P_{noise}$ is the thermal noise of the system, $P_{i,interf}$ is the interference power measured from the neighbour cells, $A_i$ is the cell load utilisation of each neighbour cell.

Once the PDSCH SINR per virtual UE values are calculated, in step 62 a corresponding achievable Modulation Coding Scheme (MCS) value can be assigned taking into account the simulated antenna product under consideration.

The user (virtual UE) demand is used at this point to estimate the number of resource elements per frame that each virtual UE requires to meet its demand. Once all virtual UEs are evaluated, the cell resource utilisation can be estimated in step 62. The cell resource utilisation can be the cell PRB utilisation. This new PRB utilisation value is then used as an input to run a second iteration of the cell load estimation and downlink (DL) NR PDSCH SINR per virtual UE process (steps 61 and 62). The calculation follows an iterative process until convergence over the PRB utilisation values is achieved (i.e. steps 61 and 62 are repeated until the PRB utilisation values converge).

Steps 61 and 62 are illustrated in the middle part of FIG. 7, which is labelled 71, for two of the virtual UEs. Thus, a first virtual UE 72 in the coverage of NR Cell B 54 has a SINR of 13 dB and a 20% PRB utilisation. A second virtual UE 73 in the coverage of NR Cell C 55 has a SINR of 17 dB and a 15% PRB utilisation.

Once the PRB utilisation values converge, in step 63 the throughput per virtual UE is calculated taking into account the load of each NR cell in the initial cell deployment 58. This is illustrated on the right side of FIG. 7, which is labelled 74. The first virtual UE 72 in the coverage of NR Cell B 54 has a SINR of 14 dB and a throughput (THP) of 500 M bits per second (Mbps). The second virtual UE 73 in the coverage of NR Cell C 55 has a SINR of 24 dB and a throughput of 750 Mbps.

Finally, in step 17 of FIG. 1, the initial cell deployment is updated based on the estimated cell resource utilisation (e.g. PRB utilisation). Updating the initial cell deployment can mean adding one of the potential NR cells not already included in the initial cell deployment, and/or removing one of the NR cells already included in the initial cell deployment. The aim of updating the initial cell deployment is to optimise, or at least improve, the cell deployment. In some embodiments, the aim of updating the initial cell deployment is to optimise, or at least improve, the performance of the cell deployment with respect to a performance target, such as reduced interference (SINR), or increased throughput.

In some embodiments, after updating the initial cell deployment, steps 15 and 16 of FIG. 1 can be repeated for the updated cell deployment. In some embodiments, steps 15-17 can be repeated a number of times to update the cell deployment, for example until a performance target (e.g. interference and/or throughput) is met by the updated cell deployment, until one or more performance metrics are optimised (e.g. interference and/or throughput), or until steps 15-17 have been repeated a predetermined number of times.

Figure 8:
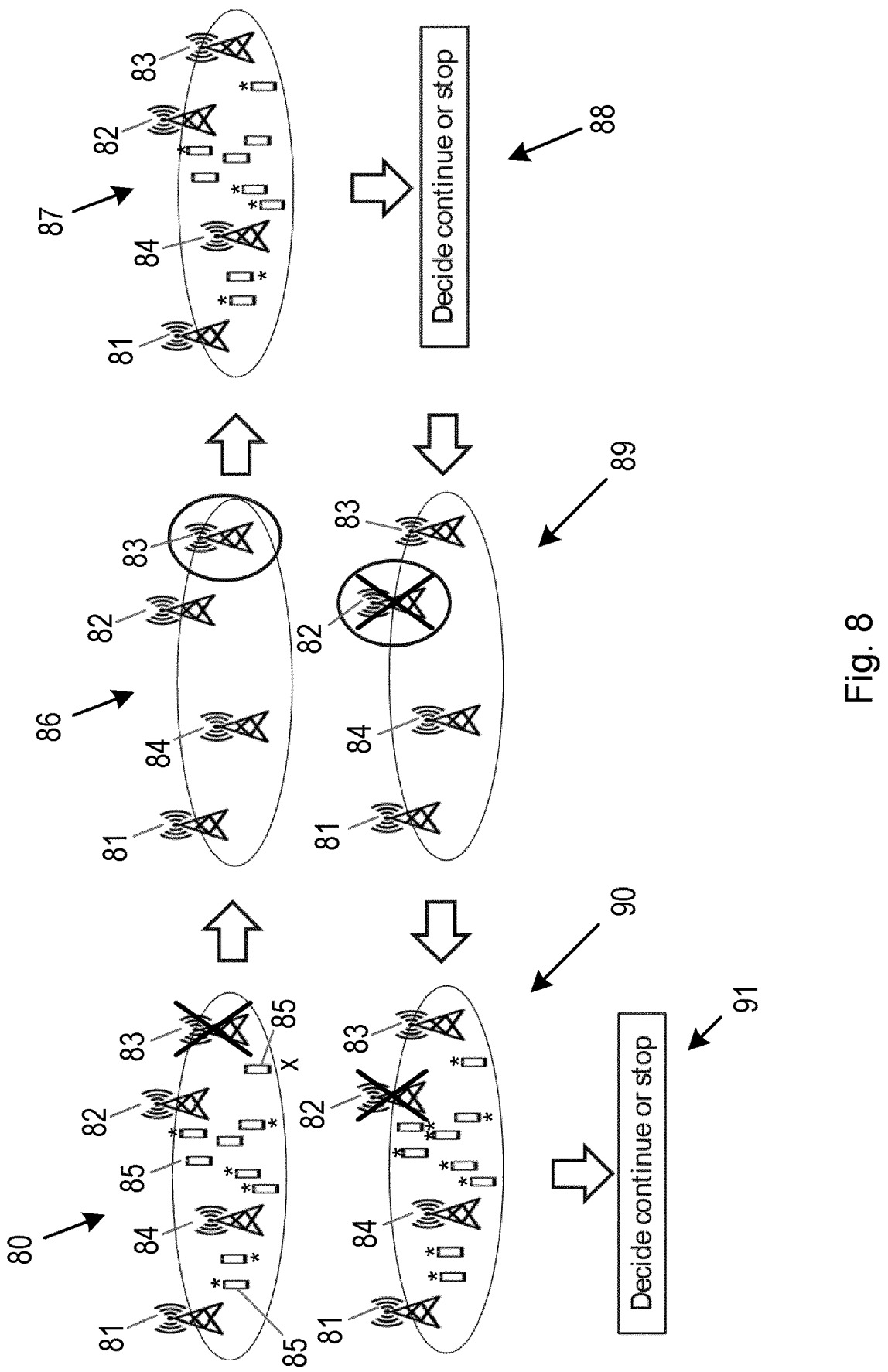
FIG. 8 is an illustration of updating the initial cell deployment for the new RAN.

FIG. 8 illustrates the iterative updating of an initial cell deployment for the NR RAN. It should be noted that the initial cell deployment shown in FIG. 8 is different to the initial cell deployment shown in the earlier figures.

A first stage 80 of FIG. 8 shows an initial cell deployment formed from a set of potential NR cells 81, 82, 83 and 84. In this initial cell deployment, potential NR cell 83 was not included (i.e. NR cell 83 is not using NR technology). A number of virtual UEs 85 are shown distributed in the area. Following step 16 of FIG. 1, the SINR for each UE 85 is determined. For the purposes of this example, the SINR is put into one of three categories: good, poor and too low. The categorised SINR is illustrated in FIG. 8 for each UE 85 as follows. A UE 85 with a 'good' SINR has a * (asterisk) above the UE 85 in FIG. 8, a UE 85 with a 'poor' SINR has a * (asterisk) below the UE 85 in FIG. 8, and a UE 85 with a 'too low' SINR has no * (asterisk) above or below the UE 85 in FIG. 8. As potential NR cell 83 is not included in the initial cell deployment, there is a virtual UE 85 that does not have coverage from any NR cell. This UE 85 is indicated by the 'x' below the UE 85 in FIG. 8. Overall, for the nine UEs 85 shown in FIG. 8, the initial cell deployment provides good coverage for four of the UEs 85, poor coverage for two of the UEs 85, 'too low' coverage for two of the UEs 85 and no coverage for one of the UEs 85.

Thus, based on the outcome of step 16 performed on the initial cell deployment in stage 80, the initial cell deployment is updated. In this case, the update comprises adding potential NR cell 83 to the cell deployment, as shown by stage 86.

At stage 87, steps 15 and 16 of FIG. 1 are performed for the updated cell deployment shown in stage 86. Thus, the coverage and performance of the updated cell deployment for the virtual UEs 85 is evaluated. The addition of NR cell 83 to the cell deployment means that all UEs 85 have NR coverage. However, the addition of NR cell 83 has increased the interference in certain parts of the updated cell deployment, which means that for the nine UEs 85 shown in FIG. 8, the updated cell deployment now provides good coverage for five of the UEs 85 (an improvement compared to the initial cell deployment), poor coverage for one of the UEs 85 (also an improvement compared to the initial cell deployment), and 'too low' coverage for three of the UEs 85 (which is worse than the initial cell deployment).

At stage 88 it is determined whether to continue updating the cell deployment with the aim of improving the performance of the cell deployment, or to stop and accept the NR RAN design. In this case, it is decided to further update the cell deployment.

At stage 89, NR cell 82 is removed from the cell deployment, and at stage 90, steps 15 and 16 of FIG. 1 are performed for the updated cell deployment shown in stage 89. Thus, the coverage and performance of the further updated cell deployment for the virtual UEs 85 is evaluated. The removal of NR cell 82 from the cell deployment still means that all UEs 85 have NR coverage. The removal of NR cell 82 has reduced the interference in certain parts of the further updated cell deployment, which means that for the nine UEs 85 shown in FIG. 8, the further updated cell deployment now provides good coverage for seven of the UEs 85 (an improvement compared to the initial cell deployment and the cell deployment shown at stage 86), and poor coverage for just two of the UEs 85 (the same as in the initial cell deployment, although one of the UEs 85 with poor coverage previously had good coverage in the initial cell deployment and the updated cell deployment). In the further updated cell deployment, no UEs 85 are considered to have 'too low' coverage (which is an improvement over the initial cell deployment and the updated cell deployment).

Following the evaluation in stage 90, in stage 91 it is decided to stop and accept the cell deployment design in stage 89.

Figure 9:
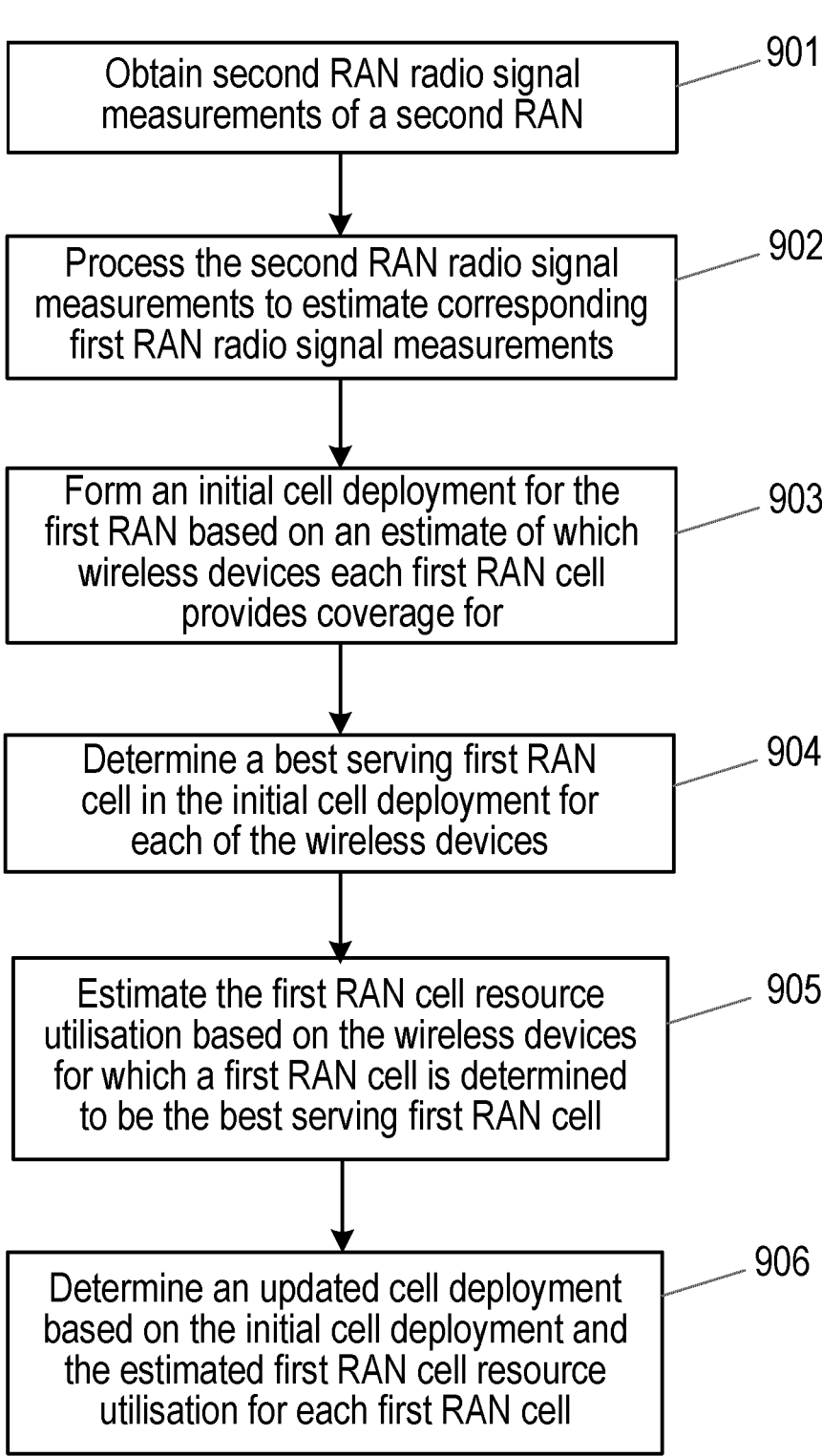
FIG. 9 is a flow chart illustrating a method of designing a radio access network according to various embodiments.

FIG. 9 is a flow chart illustrating a method of designing a radio access network according to various embodiments. The method in FIG. 9 can be performed by one or more computers, such as a server or servers, including the apparatus 1000 shown in FIG. 10. The method aims to design a first RAN that is to operate according to a first RAT in a first frequency range. In some embodiments, the first RAN is to operate according to NR, but in other embodiments the first RAN can operate according to any other cellular wireless communication technology, such as LTE, UMTS, GSM, WiFi, a 6G technology, etc. The first RAN is to be deployed on the basis of a second RAN already in use. The second RAN comprises a plurality of base stations that operate a plurality of cells. In particular, the first RAN is to make use of existing base station sites in the second RAN, for example by adding transceivers suitable for the first RAN to one or more of the existing second RAN base station sites.

In step 901, radio signal measurements of the existing second RAN are obtained. The radio signal measurements of the second RAN comprise measurements by a plurality of wireless devices (UEs) at many locations throughout the geographical area covered by the second RAN. The measurements are of radio signals on one or more frequencies from one or more of the base stations in the second RAN. The wireless devices can be wireless devices owned by subscribers of the second RAN, and the radio signal measurements can be obtained during normal operation of the wireless devices.

The second RAN can operate according to a second RAT that is different to the first RAT, and/or with a second frequency range that is different to the first frequency range. Thus, in some embodiments, the second RAN operates according to a second RAT that is different to the first RAT. The different second RAT can use the same, different, or partially overlapping, frequency range as the first RAT proposed for the first RAN. In other embodiments, the second RAN operates with the same RAT as the proposed first RAN, but with a second frequency range that is different to the first frequency range to be used by the proposed first RAN. Thus in these embodiments, the method is to design a new frequency layer for the network. In any of the above embodiments, the second RAT can be any of LTE, UMTS, GSM, WiFi, a 6G technology, etc.

In step 902, the radio signal measurements of the second RAN can be processed to estimate corresponding first RAN radio signal measurements that could be measured by the wireless devices if each of the second RAN cells were respective first RAN cells. Thus, the second RAN radio signal measurements are converted to corresponding first RAN radio signal measurements based on there being a first RAN cell for each of the second RAN cells. Step 902 corresponds generally to step 13 in FIG. 1, and thus the details provided above with respect to step 13 can also be applied to step 902.

In step 903, an initial cell deployment for the first RAN is formed. The initial cell deployment is formed based on an estimate of which wireless devices each first RAN cell provides coverage for. The estimated coverage for each first RAN cell is determined from the first RAN radio signal measurements determined in step 902. The initial cell deployment can be formed as described above with respect to step 14 of FIG. 1. The initial cell deployment should comprise a subset of the first RAN cells (i.e. not all possible first RAN cells are included in the initial cell deployment).

Next, in step 904, a best serving first RAN cell in the initial cell deployment is determined for each of the wireless devices. The best serving first RAN cell is determined based on the first RAN radio signal measurements, and for example the best serving first RAN cell can be determined to be the first RAN cell that has the highest signal strength at the wireless device. Step 904 can be performed in a similar way to step 15 of FIG. 1.

Then, in step 905, for each first RAN cell in the initial cell deployment, the cell resource utilisation is estimated based on the wireless devices for which that first RAN cell is determined to be the best serving first RAN cell. Step 905 can be performed in a similar way to step 16 of FIG. 1.

Based on the estimated cell resource utilisation, an updated cell deployment is determined in step 906. Step 906 can be performed in a similar way to step 17 of FIG. 1. That is, in step 906, one or more first RAN cells can be added to the initial cell deployment that are not yet included. Alternatively, one or more first RAN cells can be removed from the initial cell deployment. In some embodiments, one or more first RAN cells can be added to the initial cell deployment, and one or more first RAN cells already in the initial cell deployment can be removed.

Following step 906, the updated cell deployment can be used as the design for the first RAN. Alternatively, one or more iterations of steps 904, 905 and 906 can be performed using the updated cell deployment to determine a final cell deployment. In some embodiments, the final cell deployment can be obtained once a predetermined number of iterations have been performed. In alternative embodiments, the final cell deployment can be performed until one or more performance targets for the first RAN are obtained. These performance targets can relate to interference (e.g. SINR), and/or throughput. In other embodiments the final cell deployment can be determined as the cell deployment that provides the best performance metrics for the first RAN (e.g. the cell deployment that provides the best interference performance and/or the best throughput performance).

In some embodiments, the initial cell deployment can be formed in step 903 in a similar way as described above with reference to FIG. 5. In particular, firstly the number of wireless devices that each first RAN cell provides coverage for can be estimated based on the estimated first RAN radio signal measurements. The first RAN cell that provides coverage to the highest number of wireless devices is included in the initial cell deployment. Ignoring the wireless devices that receive coverage from the first RAN cell included in the initial cell deployment, the number of wireless devices that each remaining first RAN cell provides coverage for is re-estimated. The remaining first RAN cell that provides coverage to the highest number of wireless devices is included in the initial cell deployment. This repeats until a criterion is satisfied. The criterion can be that coverage is provided to all wireless devices (i.e. the criterion can be satisfied if there no wireless devices without coverage from at least one first RAN cell in the initial cell deployment). Alternatively the criterion can be that the number of wireless devices that coverage is not yet provided for is less than a threshold (i.e. the criterion can be satisfied once there are less than a threshold number of wireless devices without coverage from at least one first RAN cell in the initial cell deployment).

The cell resource utilisation can be performed in step 905 as follows. Firstly, for each first RAN cell included in the initial cell deployment, a first RAN cell load is estimated based on the wireless devices for which that first RAN cell is determined to be the best serving first RAN cell. A first RAN downlink signal quality is estimated for each wireless device based on the estimated first RAN cell loads. In the case of a new NR RAN, the downlink signal quality can be NR PDSCH SINR. Then, the first RAN cell resource utilisation for each first RAN cell is estimated using the estimated first RAN downlink signal quality for each wireless device and the estimated first RAN cell load.

In certain embodiments, the wireless devices may use the new first RAN for user data, but each wireless device is required to use the existing second RAN for control plane signalling. In that case, coverage from the second RAN (as indicated by the second RAN radio signal measurements obtained in step 901) is also required for each wireless device, in addition to coverage from the first RAN (as determined in step 904). Coverage from the first RAN can also be evaluated in step 904, or alternatively evaluated earlier in the method, for example once the second RAN radio signal measurements are obtained in step 901. Any wireless device not having coverage from the second RAN will not be able to make use of the new first RAN either (since a control plane signalling connection is required to support the user plane connection), and so such wireless devices are not considered further in the design method (e.g. these wireless devices are not considered when estimating the first RAN cell resource utilisation in step 905). It should be noted that the particular second RAN cell providing the control plane signalling does not affect which of the first RAN cells is the best serving first RAN cell for a particular wireless device since the control plane signalling can be provided by any second RAN cell, even a cell provided by base station that is not co-located with the base station providing the best serving first RAN cell. As noted above, in certain embodiments the first RAT is NR and the second RAT is LTE, and in these embodiments, wireless devices can use the NR RAN for user plane signalling, and the existing LTE RAN for control plane signalling. In the case of the second RAN being LTE, coverage for control plane signalling for each wireless device can be evaluated using criteria (1)-(3).

In some embodiments, prior to step 902, the second RAN radio signal measurements obtained in step 901 can be grouped to form radio signal measurements that could be obtained by virtual wireless devices. In particular, where the second RAN radio signal measurements include several closely-spaced radio signal measurements (in terms of the timing of the radio signal measurements) by a particular wireless device, typically of radio signals on different frequency bands and/or from different neighbouring cells, these radio signal measurements can be combined into a single set of radio signal measurements that could have been obtained by a virtual wireless device that was able to obtain each of those radio signal measurements in a single measurement operation. In these embodiments, the radio signal measurements obtained by a virtual wireless device, and the virtual wireless devices themselves (in terms of identifying coverage and cell resource usage, etc.) are used in the subsequent steps of the method of FIG. 9.

Figure 10:
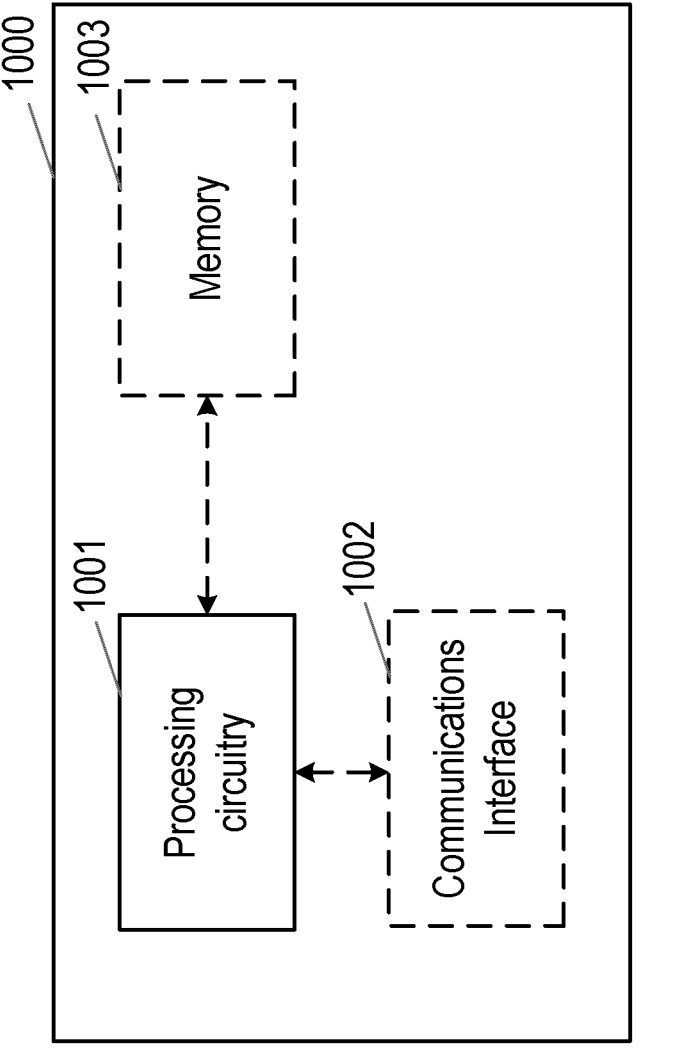
FIG. 10 is a block diagram of an apparatus according to various embodiments.

FIG. 10 illustrates an apparatus 1000 according to various embodiments that can be used to implement the techniques described herein. For example the apparatus 1000 can be used to implement one or more, or all, of the steps of the method shown in FIG. 1 or one or more, or all, of the steps shown in FIG. 9.

The apparatus 1000 comprises processing circuitry (or logic) 1001. It will be appreciated that the apparatus 1000 may comprise one or more virtual machines running different software and/or processes. The apparatus 1000 may therefore comprise one or more servers and/or storage devices and/or may comprise cloud computing infrastructure that runs the software and/or processes.

The processing circuitry 1001 controls the operation of the apparatus 1000 and can implement the methods described herein. The processing circuitry 1001 can comprise one or more processors, processing units, multi-core processors or modules that are configured or programmed to control the apparatus 1000 in the manner described herein. In particular implementations, the processing circuitry 1001 can comprise a plurality of software and/or hardware modules that are each configured to perform, or are for performing, individual or multiple steps of the method described herein.

In some embodiments, the apparatus 1000 may optionally comprise a communications interface 1002. The communications interface 1002 can be for use in communicating with other apparatuses, other servers, and/or one or more storage devices where the signal quality measurements may be stored. The processing circuitry 1001 may be configured to control the communications interface 1002 to transmit to and/or receive information, data, signals, or similar.

Optionally, the apparatus 1000 may comprise a memory 1003. In some embodiments, the memory 1003 can be configured to store program code that can be executed by the processing circuitry 1001 to perform any of the methods described herein. Alternatively or in addition, the memory 1003 can be configured to store any information, data, signals, or similar that are described herein. The processing circuitry 1001 may be configured to control the memory 1003 to store such information therein.

Thus, the techniques described above provide improvements in the design of a new RAN layer based on end user metrics, without the need to rely on 3PP planning tools and propagation models. The validity of the designed RAN layer relies on the statistical relevance of the network users, where several traces/measurements collection campaigns can be programmed or configured in order to capture the traffic profile in different conditions of the network (e.g. working hours, night traffic, weekend profile, etc.), which can be processed and aggregated in order to take decisions on cell site selection.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method of designing a first Radio Access Network (RAN) that is to operate according to a first Radio Access Technology (RAT) in a first frequency range, the method comprising:

obtaining second RAN radio signal measurements of a second RAN that operates according to a second RAT different from the first RAT and/or in a second frequency range that is different from the first frequency range, wherein the second RAN comprises a plurality of second RAN base stations that operate a plurality of second RAN cells and the second RAN radio signal measurements comprise measurements by a plurality of wireless devices of radio signals on one or more frequencies from one or more of the plurality of second RAN base stations;

processing the second RAN radio signal measurements to estimate corresponding first RAN radio signal measurements that could be measured by said wireless devices if each of said second RAN cells were respective first RAN cells operating according to the first RAT and in the first frequency range;

forming an initial cell deployment for the first RAN based on an estimate of which wireless devices each first RAN cell provides coverage for according to said first RAN radio signal measurements, wherein the initial cell deployment comprises a subset of the first RAN cells;

determining a best serving first RAN cell in the initial cell deployment for each of the wireless devices based on the first RAN radio signal measurements;

estimating the first RAN cell resource utilization, for each first RAN cell in the initial cell deployment, based on the wireless devices for which said first RAN cell is determined to be the best serving first RAN cell; and determining an updated cell deployment based on the initial cell deployment and the estimated first RAN cell resource utilization for each first RAN cell in the initial cell deployment.

2. The method of claim 1, further comprising performing one or more additional iterations of determining the best serving first RAN cell, estimating the first RAN cell resource utilization, and determining the updated cell deployment to determine a final cell deployment.

3. The method of claim 2, wherein performing the one or more additional iterations comprises performing the one or more additional iterations until one or more performance targets for the first RAN are obtained.

4. The method of claim 1, wherein determining the updated cell deployment comprises:

adding one or more first RAN cells to the cell deployment that are not yet included in the initial cell deployment based on the estimated first RAN cell resource utilization for each first RAN cell; or removing one or more first RAN cells from the initial cell deployment based on the estimated first RAN cell resource utilization for each first RAN cell.

5. The method of claim 1, wherein forming the initial cell deployment for the first RAN comprises:

estimating how many wireless devices each first RAN cell provides coverage for based on the estimated first RAN radio signal measurements;

including in the initial cell deployment the first RAN cell that provides coverage to the highest number of wireless devices; and performing one or more process iterations until a criterion is satisfied, each process iteration comprising:

for each remaining first RAN cell not yet included in the initial cell deployment, re-estimating how many wireless devices in a subset of the wireless devices each of the remaining first RAN cells provides coverage to, wherein the subset of wireless devices comprises wireless devices that do not have coverage from a first RAN cell already included in the initial cell deployment;

including in the initial cell deployment the remaining first RAN cell that provides coverage to the highest number of wireless devices in the subset of wireless devices.

6. The method of claim 5, wherein the criterion is satisfied if the subset of wireless devices is empty.

7. The method of claim 5, wherein the criterion is satisfied if the subset of wireless devices comprises less than a threshold number of wireless devices.

8. The method of claim 1, wherein estimating the first RAN cell resource utilization for each first RAN cell in the initial cell deployment comprises:

for each first RAN cell in the initial cell deployment, estimating a first RAN cell load based on the wireless devices for which said first RAN cell is determined to be the best serving first RAN cell;

estimating a respective first RAN downlink signal quality for each wireless device based on the estimated first RAN cell loads; and estimating the first RAN cell resource utilization for each first RAN cell using the estimated first RAN downlink signal quality for each wireless device and the estimated first RAN cell load.

9. The method of claim 1, wherein the first RAT is New Radio (NR) and the second RAT is Long Term Evolution (LTE).

10. The method of claim 9, wherein a wireless device is to use the second RAN for user plane signaling and the first RAN for control plane signaling.

11. The method of claim 10, further comprising determining whether the wireless device has coverage from the second RAN according to the second RAN radio signal measurements.

12. An apparatus for designing a first Radio Access Network (RAN) that is to operate according to a first Radio Access Technology (RAT) in a first frequency range, the apparatus comprising:

processing circuitry and a memory storing instructions executable by the processing circuitry whereby the apparatus is configured to:

obtain second RAN radio signal measurements of a second RAN that operates according to a second RAT different from the first RAT and/or in a second frequency range that is different from the first frequency range, wherein the second RAN comprises a plurality of second RAN base stations that operate a plurality of second RAN cells and the second RAN radio signal measurements comprise measurements by a plurality of wireless devices of radio signals on one or more frequencies from one or more of the plurality of second RAN base stations;

process the second RAN radio signal measurements to estimate corresponding first RAN radio signal measurements that could be measured by said wireless devices if each of said second RAN cells were respective first RAN cells operating according to the first RAT and in the first frequency range;

form an initial cell deployment for the first RAN based on an estimate of which wireless devices each first RAN cell provides coverage for according to said first RAN radio signal measurements, wherein the initial cell deployment comprises a subset of the first RAN cells;

determine a best serving first RAN cell in the initial cell deployment for each of the wireless devices based on the first RAN radio signal measurements;

estimate the first RAN cell resource utilization, for each first RAN cell in the initial cell deployment, based on the wireless devices for which said first RAN cell is determined to be the best serving first RAN cell; and determine an updated cell deployment based on the initial cell deployment and the estimated first RAN cell resource utilization for each first RAN cell in the initial cell deployment.

13. The apparatus of claim 12, wherein the apparatus is further configured to perform one or more additional iterations of determining the best serving first RAN cell, estimating the first RAN cell resource utilization, and determining the updated cell deployment to determine a final cell deployment.

14. The apparatus of claim 13, wherein to perform the one or more additional iterations, the apparatus is configured to perform the one or more additional iterations until one or more performance targets for the first RAN are obtained.

15. The apparatus of claim 13, wherein to determine the updated cell deployment, the apparatus is configured to:

add one or more first RAN cells to the cell deployment that are not yet included in the initial cell deployment based on the estimated first RAN cell resource utilization for each first RAN cell; or remove one or more first RAN cells from the initial cell deployment based on the estimated first RAN cell resource utilization for each first RAN cell.

16. The apparatus of claim 13, wherein to form the initial cell deployment for the first RAN the apparatus is configured to:

estimate how many wireless devices each first RAN cell provides coverage for based on the estimated first RAN radio signal measurements;

include in the initial cell deployment the first RAN cell that provides coverage to the highest number of wireless devices; and perform one or more process iterations until a criterion is satisfied, each process iteration comprising:

for each remaining first RAN cell not yet included in the initial cell deployment, re-estimating how many wireless devices in a subset of the wireless devices each of the remaining first RAN cells provides coverage to, wherein the subset of wireless devices comprises wireless devices that do not have coverage from a first RAN cell already included in the initial cell deployment; and including in the initial cell deployment the remaining first RAN cell that provides coverage to the highest number of wireless devices in the subset of wireless devices.

17. The apparatus of claim 16, wherein the criterion is satisfied if the subset of wireless devices is empty.

18. The apparatus of claim 16, wherein the criterion is satisfied if the subset of wireless devices comprises less than a threshold number of wireless devices.

19. The apparatus of claim 13, wherein to estimate the first RAN cell resource utilization for each first RAN cell in the initial cell deployment the apparatus is configured to:

for each first RAN cell in the initial cell deployment, estimate a first RAN cell load based on the wireless devices for which said first RAN cell is determined to be the best serving first RAN cell;

estimate a respective first RAN downlink signal quality for each wireless device based on the estimated first RAN cell loads; and estimate the first RAN cell resource utilization for each first RAN cell using the estimated first RAN downlink signal quality for each wireless device and the estimated first RAN cell load.

20. The apparatus of claim 13, wherein the first RAT is New Radio (NR) and the second RAT is Long Term Evolution (LTE).

21. The apparatus of claim 20, wherein a wireless device is to use the second RAN for user plane signaling and the first RAN for control plane signaling.

22. The apparatus of claim 21, wherein the apparatus is further configured to determine whether the wireless device has coverage from the second RAN according to the second RAN radio signal measurements.

23. A non-transitory computer readable medium storing a computer program product for controlling a programmable apparatus to design a first Radio Access Network (RAN) that is to operate according to a first Radio Access Technology (RAT) in a first frequency range, the computer program product comprising software instructions that, when run on the programmable apparatus, cause the programmable apparatus to:

obtain second RAN radio signal measurements of a second RAN that operates according to a second RAT different from the first RAT and/or in a second frequency range that is different from the first frequency range, wherein the second RAN comprises a plurality of second RAN base stations that operate a plurality of second RAN cells and the second RAN radio signal measurements comprise measurements by a plurality of wireless devices of radio signals on one or more frequencies from one or more of the plurality of second RAN base stations;

process the second RAN radio signal measurements to estimate corresponding first RAN radio signal measurements that could be measured by said wireless devices if each of said second RAN cells were respective first RAN cells operating according to the first RAT and in the first frequency range;

form an initial cell deployment for the first RAN based on an estimate of which wireless devices each first RAN cell provides coverage for according to said first RAN radio signal measurements, wherein the initial cell deployment comprises a subset of the first RAN cells;

determine a best serving first RAN cell in the initial cell deployment for each of the wireless devices based on the first RAN radio signal measurements;

estimate the first RAN cell resource utilization, for each first RAN cell in the initial cell deployment, based on the wireless devices for which said first RAN cell is determined to be the best serving first RAN cell; and determine an updated cell deployment based on the initial cell deployment and the estimated first RAN cell resource utilization for each first RAN cell in the initial cell deployment.

* * * * *